US009602875B2

(12) United States Patent
Hussain

(10) Patent No.: US 9,602,875 B2
(45) Date of Patent: Mar. 21, 2017

(54) BROADCAST CONTENT RESUME REMINDER

(71) Applicant: ECHOSTAR UK HOLDINGS LIMITED, Keighley (GB)

(72) Inventor: Zahid Hussain, Halifax (GB)

(73) Assignee: EchoStar UK Holdings Limited, Steeton (GB)

( * ) Notice: Subject to any disclaimer, the term of this patent is extended or adjusted under 35 U.S.C. 154(b) by 0 days.

(21) Appl. No.: 14/200,864

(22) Filed: Mar. 7, 2014

(65) Prior Publication Data

US 2014/0282714 A1   Sep. 18, 2014

Related U.S. Application Data

(60) Provisional application No. 61/793,297, filed on Mar. 15, 2013.

(51) Int. Cl.
H04N 21/472 (2011.01)
H04N 21/426 (2011.01)
H04N 21/438 (2011.01)
H04N 21/81 (2011.01)

(52) U.S. Cl.
CPC ....... H04N 21/472 (2013.01); H04N 21/4263 (2013.01); H04N 21/4383 (2013.01); H04N 21/812 (2013.01)

(58) Field of Classification Search
CPC ...... H04N 24/4882; H04N 11/00; H04N 5/50; H04N 21/472; H04N 21/4263; H04N 21/4383; H04N 21/812
USPC ........................ 725/34, 22, 32; 348/565, 460
See application file for complete search history.

(56) References Cited

U.S. PATENT DOCUMENTS

| 6,005,562 | A  | 12/1999 | Shiga et al. |
| 6,177,931 | B1 | 1/2001  | Alexander et al. |
| 6,681,396 | B1 | 1/2004  | Bates et al. |
| 7,174,512 | B2 | 2/2007  | Martin et al. |
| 7,633,887 | B2 | 12/2009 | Panwar et al. |
| 7,680,894 | B2 | 3/2010  | Diot et al. |

(Continued)

FOREIGN PATENT DOCUMENTS

EP   1 865 716 A2   12/2007
EP   2 309 733 B1   4/2011

(Continued)

OTHER PUBLICATIONS

International Search Report and Written Opinion of PCT/US2014/033796 mailed Sep. 5, 2014, 12 pages.

(Continued)

Primary Examiner — Nathan Flynn
Assistant Examiner — Caroline Somera
(74) Attorney, Agent, or Firm — Kilpatrick Townsend & Stockton LLP

(57) ABSTRACT

A service configured to or for reminding a television viewer what or which particular programming they were watching prior to surfing other programming when a commercial break occurs during the particular programming. An option may be made available to the television viewer prior to the end of the commercial break that allows the television viewer to return to watching the particular programming, so that the television viewer does not unintentionally miss any content associated with the particular programming.

19 Claims, 6 Drawing Sheets

(56) References Cited

U.S. PATENT DOCUMENTS

| | | | |
|---|---|---|---|
| 7,774,811 B2 | 8/2010 | Poslinski et al. | |
| 7,818,368 B2 | 10/2010 | Yang et al. | |
| 7,825,989 B1 | 11/2010 | Greenberg | |
| 7,849,487 B1 | 12/2010 | Vosseller | |
| 8,046,798 B1 | 10/2011 | Schlack et al. | |
| 8,079,052 B2 | 12/2011 | Chen et al. | |
| 8,104,065 B2 | 1/2012 | Aaby et al. | |
| 8,209,713 B1* | 6/2012 | Lai et al. | 725/10 |
| 8,296,797 B2 | 10/2012 | Olstad et al. | |
| 8,312,486 B1 | 11/2012 | Briggs et al. | |
| 8,424,041 B2 | 4/2013 | Candelore et al. | |
| 8,627,349 B2 | 1/2014 | Kirby et al. | |
| 8,689,258 B2 | 4/2014 | Kemp | |
| 8,752,084 B1* | 6/2014 | Lai | H04H 60/375 725/14 |
| 8,973,038 B2 | 3/2015 | Gratton | |
| 8,990,418 B1 | 3/2015 | Bragg et al. | |
| 9,038,127 B2 | 5/2015 | Hastings et al. | |
| 9,066,156 B2 | 6/2015 | Kapa | |
| 9,213,986 B1 | 12/2015 | Buchheit et al. | |
| 9,253,533 B1 | 2/2016 | Morgan et al. | |
| 9,264,779 B2 | 2/2016 | Kirby et al. | |
| 9,420,333 B2 | 8/2016 | Martch et al. | |
| 2001/0013123 A1* | 8/2001 | Freeman et al. | 725/34 |
| 2001/0026609 A1 | 10/2001 | Weinstein et al. | |
| 2002/0059610 A1 | 5/2002 | Ellis | |
| 2002/0067376 A1 | 6/2002 | Martin et al. | |
| 2002/0075402 A1* | 6/2002 | Robson et al. | 348/460 |
| 2002/0174430 A1 | 11/2002 | Ellis et al. | |
| 2002/0178444 A1* | 11/2002 | Trajkovic et al. | 725/32 |
| 2003/0023742 A1 | 1/2003 | Allen et al. | |
| 2003/0056220 A1 | 3/2003 | Thornton et al. | |
| 2003/0066077 A1 | 4/2003 | Gutta et al. | |
| 2003/0118014 A1 | 6/2003 | Iyer et al. | |
| 2003/0126605 A1 | 7/2003 | Betz et al. | |
| 2003/0126606 A1 | 7/2003 | Buczak et al. | |
| 2003/0188317 A1 | 10/2003 | Liew et al. | |
| 2003/0189674 A1 | 10/2003 | Inoue et al. | |
| 2003/0208763 A1 | 11/2003 | McElhatten et al. | |
| 2003/0229899 A1 | 12/2003 | Thompson et al. | |
| 2004/0181807 A1 | 9/2004 | Theiste et al. | |
| 2005/0030977 A1 | 2/2005 | Casey et al. | |
| 2005/0044570 A1 | 2/2005 | Poslinski | |
| 2005/0071865 A1 | 3/2005 | Martins | |
| 2005/0125302 A1 | 6/2005 | Brown et al. | |
| 2005/0152565 A1 | 7/2005 | Jouppi et al. | |
| 2005/0166230 A1 | 7/2005 | Gaydou et al. | |
| 2005/0180568 A1 | 8/2005 | Krause | |
| 2005/0240961 A1 | 10/2005 | Jerding et al. | |
| 2005/0264705 A1 | 12/2005 | Kitamura | |
| 2006/0020962 A1 | 1/2006 | Stark et al. | |
| 2006/0085828 A1 | 4/2006 | Dureau et al. | |
| 2006/0174277 A1 | 8/2006 | Sezan et al. | |
| 2006/0190615 A1 | 8/2006 | Panwar et al. | |
| 2006/0238656 A1 | 10/2006 | Chen et al. | |
| 2006/0253581 A1 | 11/2006 | Dixon et al. | |
| 2006/0282869 A1 | 12/2006 | Plourde, Jr. | |
| 2007/0033616 A1 | 2/2007 | Gutta | |
| 2007/0058930 A1 | 3/2007 | Iwamoto | |
| 2007/0083901 A1 | 4/2007 | Bond | |
| 2007/0127894 A1 | 6/2007 | Ando et al. | |
| 2007/0146554 A1* | 6/2007 | Strickland et al. | 348/731 |
| 2007/0154163 A1 | 7/2007 | Cordray | |
| 2007/0154169 A1 | 7/2007 | Cordray et al. | |
| 2007/0157235 A1* | 7/2007 | Teunissen | H04N 5/50 725/38 |
| 2007/0157249 A1 | 7/2007 | Cordray et al. | |
| 2007/0157253 A1 | 7/2007 | Ellis et al. | |
| 2007/0188655 A1 | 8/2007 | Ohta | |
| 2007/0199040 A1 | 8/2007 | Kates | |
| 2007/0226766 A1 | 9/2007 | Poslinski et al. | |
| 2007/0245379 A1 | 10/2007 | Agnihortri | |
| 2008/0022012 A1 | 1/2008 | Wang | |
| 2008/0086743 A1 | 4/2008 | Cheng et al. | |
| 2008/0097949 A1 | 4/2008 | Kelly et al. | |
| 2008/0109307 A1 | 5/2008 | Ullah | |
| 2008/0134043 A1 | 6/2008 | Georgis et al. | |
| 2008/0163305 A1 | 7/2008 | Johnson et al. | |
| 2008/0195457 A1 | 8/2008 | Sherman et al. | |
| 2008/0235348 A1 | 9/2008 | Dasgupta | |
| 2008/0300982 A1 | 12/2008 | Larson et al. | |
| 2008/0320523 A1 | 12/2008 | Morris et al. | |
| 2009/0044217 A1 | 2/2009 | Lutterbach et al. | |
| 2009/0055385 A1 | 2/2009 | Jeon et al. | |
| 2009/0102984 A1* | 4/2009 | Arling | H04N 5/44 348/734 |
| 2009/0138902 A1* | 5/2009 | Kamen | H04N 5/44543 725/9 |
| 2009/0178071 A1 | 7/2009 | Whitehead | |
| 2009/0234828 A1 | 9/2009 | Tu | |
| 2009/0249412 A1 | 10/2009 | Bhogal et al. | |
| 2009/0293093 A1 | 11/2009 | Igarashi | |
| 2009/0299824 A1 | 12/2009 | Barnes, Jr. | |
| 2009/0325523 A1 | 12/2009 | Choi | |
| 2010/0040151 A1 | 2/2010 | Garrett | |
| 2010/0071007 A1 | 3/2010 | Meijer | |
| 2010/0071062 A1 | 3/2010 | Choyi et al. | |
| 2010/0089996 A1 | 4/2010 | Koplar | |
| 2010/0122294 A1 | 5/2010 | Craner | |
| 2010/0146560 A1 | 6/2010 | Bonfrer | |
| 2010/0153983 A1 | 6/2010 | Phillmon et al. | |
| 2010/0153999 A1 | 6/2010 | Yates | |
| 2010/0158479 A1 | 6/2010 | Craner | |
| 2010/0166389 A1 | 7/2010 | Knee et al. | |
| 2010/0169925 A1 | 7/2010 | Takegoshi | |
| 2010/0218214 A1 | 8/2010 | Fan et al. | |
| 2010/0251295 A1 | 9/2010 | Amento et al. | |
| 2010/0262986 A1 | 10/2010 | Adimatyam et al. | |
| 2010/0269144 A1 | 10/2010 | Forsman et al. | |
| 2010/0319019 A1 | 12/2010 | Zazza | |
| 2010/0322592 A1 | 12/2010 | Casagrande | |
| 2011/0016492 A1 | 1/2011 | Morita | |
| 2011/0019839 A1 | 1/2011 | Nandury | |
| 2011/0052156 A1 | 3/2011 | Kuhn | |
| 2011/0072448 A1 | 3/2011 | Stiers et al. | |
| 2011/0109801 A1 | 5/2011 | Thomas et al. | |
| 2011/0202956 A1 | 8/2011 | Connelly et al. | |
| 2011/0206342 A1 | 8/2011 | Thompson et al. | |
| 2011/0239249 A1 | 9/2011 | Murison et al. | |
| 2011/0243533 A1* | 10/2011 | Stern | H04N 21/2541 386/278 |
| 2011/0252451 A1 | 10/2011 | Turgeman et al. | |
| 2011/0286721 A1 | 11/2011 | Craner | |
| 2011/0289410 A1 | 11/2011 | Paczkowski et al. | |
| 2011/0293113 A1 | 12/2011 | McCarthy | |
| 2012/0020641 A1 | 1/2012 | Sakaniwa et al. | |
| 2012/0060178 A1 | 3/2012 | Minakuchi et al. | |
| 2012/0106932 A1 | 5/2012 | Grevers, Jr. | |
| 2012/0131613 A1 | 5/2012 | Ellis et al. | |
| 2012/0185895 A1 | 7/2012 | Wong et al. | |
| 2012/0204209 A1 | 8/2012 | Kubo | |
| 2012/0230651 A1 | 9/2012 | Chen | |
| 2012/0246672 A1 | 9/2012 | Sridhar et al. | |
| 2012/0278837 A1 | 11/2012 | Curtis et al. | |
| 2012/0311633 A1 | 12/2012 | Mandrekar et al. | |
| 2013/0014159 A1 | 1/2013 | Wiser et al. | |
| 2013/0055304 A1 | 2/2013 | Kirby et al. | |
| 2013/0061313 A1 | 3/2013 | Cullimore et al. | |
| 2013/0074109 A1 | 3/2013 | Skelton et al. | |
| 2013/0114940 A1 | 5/2013 | Merzon et al. | |
| 2013/0128119 A1 | 5/2013 | Madathodiyil et al. | |
| 2013/0145023 A1 | 6/2013 | Li et al. | |
| 2013/0174196 A1 | 7/2013 | Herlein | |
| 2013/0194503 A1 | 8/2013 | Yamashita | |
| 2013/0283162 A1 | 10/2013 | Aronsson et al. | |
| 2013/0298151 A1 | 11/2013 | Leske et al. | |
| 2013/0332962 A1 | 12/2013 | Moritz et al. | |
| 2013/0346302 A1 | 12/2013 | Purves et al. | |
| 2014/0032709 A1 | 1/2014 | Saussy et al. | |
| 2014/0068675 A1 | 3/2014 | Mountain | |
| 2014/0123160 A1 | 5/2014 | van Coppenolle et al. | |
| 2014/0139555 A1 | 5/2014 | Levy | |
| 2014/0140680 A1 | 5/2014 | Jo | |
| 2014/0153904 A1 | 6/2014 | Adimatyam et al. | |

(56) References Cited

U.S. PATENT DOCUMENTS

| | | |
|---|---|---|
| 2014/0157327 A1 | 6/2014 | Roberts et al. |
| 2014/0215539 A1 | 7/2014 | Chen et al. |
| 2014/0282741 A1 | 9/2014 | Shoykhet |
| 2014/0282745 A1* | 9/2014 | Chipman et al. ............... 725/61 |
| 2014/0282759 A1* | 9/2014 | Harvey et al. ................... 725/89 |
| 2014/0294201 A1 | 10/2014 | Johnson et al. |
| 2014/0310819 A1 | 10/2014 | Cakarel et al. |
| 2014/0313341 A1 | 10/2014 | Stribling |
| 2014/0325556 A1 | 10/2014 | Hoang et al. |
| 2014/0331260 A1 | 11/2014 | Gratton |
| 2014/0333841 A1 | 11/2014 | Steck |
| 2014/0351045 A1 | 11/2014 | Abihssira et al. |
| 2014/0373079 A1 | 12/2014 | Friedrich et al. |
| 2015/0003814 A1 | 1/2015 | Miller |
| 2015/0020097 A1 | 1/2015 | Freed et al. |
| 2015/0040176 A1* | 2/2015 | Hybertson ......... H04N 21/4383 |
| | | 725/131 |
| 2015/0058890 A1 | 2/2015 | Kapa |
| 2015/0095932 A1 | 4/2015 | Ren |
| 2015/0118992 A1 | 4/2015 | Wyatt et al. |
| 2015/0181132 A1 | 6/2015 | Kummer et al. |
| 2015/0181279 A1 | 6/2015 | Martch et al. |
| 2015/0249803 A1 | 9/2015 | Tozer et al. |
| 2015/0249864 A1 | 9/2015 | Tang et al. |
| 2015/0310725 A1 | 10/2015 | Koskan et al. |
| 2016/0066020 A1 | 3/2016 | Mountain |
| 2016/0066026 A1 | 3/2016 | Mountain |
| 2016/0066049 A1 | 3/2016 | Mountain |
| 2016/0066056 A1 | 3/2016 | Mountain |
| 2016/0073172 A1 | 3/2016 | Sharples |
| 2016/0088351 A1 | 3/2016 | Petruzzelli et al. |
| 2016/0191147 A1 | 6/2016 | Martch |
| 2016/0198229 A1 | 7/2016 | Keipert |

FOREIGN PATENT DOCUMENTS

| | | |
|---|---|---|
| EP | 2 403 239 A1 | 1/2012 |
| FR | 2 902 568 A1 | 12/2007 |
| JP | H10 322622 A | 12/1998 |
| JP | 2006-245745 A | 9/2006 |
| KR | 2004 0025073 A | 3/2004 |
| KR | 2006 0128295 A | 12/2006 |
| WO | 98/37694 A1 | 8/1998 |
| WO | 2005/059807 A2 | 6/2005 |
| WO | 2007/064987 A2 | 6/2007 |
| WO | 2007/098067 A1 | 8/2007 |
| WO | 2009/073925 A1 | 6/2009 |
| WO | 2013/016626 A1 | 1/2013 |
| WO | 2014/072742 A1 | 5/2014 |
| WO | 2014/179017 A1 | 11/2014 |
| WO | 2016/030384 | 3/2016 |
| WO | 2016/030477 A1 | 3/2016 |
| WO | 2016/034899 A1 | 3/2016 |

OTHER PUBLICATIONS

U.S. Appl. No. 13/971,579, filed Aug. 20, 2013 Non Final Office Action mailed Oct. 28, 2014, 35 pages.
Extended European Search Report for EP 14160140.1, 7 pages.
Extended European Search Report for EP 11166892.7 dated Oct. 6, 2011, 7 pages.
U.S. Appl. No. 13/942,451, filed Jul. 15, 2013 Non Final Office Action mailed Jul. 28, 2014, 27 pages.
U.S. Appl. No. 13/919,702, filed Jun. 17, 2013 Non Final Office Action mailed Jun. 11, 2014, 25 pages.
Jin S H et al., "Intelligent broadcasting system and services for personalized semantic contents consumption", Expert Systems With Applications, Oxford, GB, vol. 31, No. 1, Jul. 1, 2006, pp. 164-173, XP024962718, ISSN: 0957-4174, DOI: 10.1016/J.ESWA.2005.09. 021.
Sung Ho Jin et al., "Real-time content filtering for live broadcasts in TV terminals", Multimedia Tools and Applications, Kluwer Academic Publishers, BO, vol. 36, No. 3, Jun. 29, 2007 pp. 285-301, XP019578768, ISSN: 1573-7721.
European Search Report for EP 14197940.1 mailed Apr. 28, 2015, 13 pages.
U.S. Appl. No. 14/470,248, filed Aug. 27, 2014, Preinterview first office action mailed Sep. 4, 2015, 22 pages.
U.S. Appl. No. 14/470,279, filed Aug. 27, 2014, Preinterview first office action mailed Aug. 26, 2015, 23 pages.
U.S. Appl. No. 14/470,007, filed Sep. 5, 2014, Non-Final Office Action mailed Sep. 1, 2015, 44 pages.
U.S. Appl. No. 14/095,860, filed Dec. 3, 2013, Final Office Action mailed May 1, 2015, 18 pages.
U.S. Appl. No. 14/095,860, filed Dec. 3, 2013, Notice of Allowance mailed Jul. 13, 2015, 31 pages.
U.S. Appl. No. 13/942,451, filed Jul. 15, 2013, Final Office Action mailed Apr. 30, 2015, 33 pages.
U.S. Appl. No. 13/919,702, filed Jun. 17, 2013 Non-Final Office Action mailed Apr. 30, 2015, 26 pages.
U.S. Appl. No. 14/071,613, filed Nov. 4, 2013, Non-Final Office Action mailed May 18, 2015, 20 pages.
U.S. Appl. No. 14/139,420, filed Dec. 23, 2013, Non-Final Office Action mailed Apr. 30, 2015, 27 pages.
U.S. Appl. No. 14/139,299, filed Dec. 23, 2013, Final Office Action mailed Feb. 25, 2016, all pages.
U.S. Appl. No. 14/139,420, filed Dec. 23, 2013 Notice of Allowance mailed Mar. 31, 2016, 37 pages.
U.S. Appl. No. 14/470,392, filed Aug. 27, 2014 Final Office Action mailed Mar. 4, 2016, all pages.
U.S. Appl. No. 14/470,415, filed Aug. 27, 2014 Final Office Action mailed Mar. 3, 2016, all pages.
Office Action for EP 14160140.1 mailed Jan. 19, 2016, 5 pages.
International Search Report and Written Opinion for PCT/EP2015/069461 mailed Oct. 1, 2015, 13 pages.
International Search Report and Written Opinion for PCT/EP2015/069456 mailed Oct. 5, 2015, all pages.
International Preliminary Report on Patentability for PCT/US2014/033796 issued Nov. 3, 2015, all pages.
International Search Report and Written Opinion for PCT/EP2015/069681 mailed Nov. 23, 2015, 12 pages.
International Search Report and Written Opinion for PCT/GB2015/052570 mailed Dec. 11, 2015, 13 pages.
U.S. Appl. No. 14/470,248, filed Aug. 27, 2014, Final Office Action mailed Feb. 16, 2016, 26 pages.
U.S. Appl. No. 14/470,279, filed Aug. 27, 2014, Final Office Action mailed Jan. 22, 2016, 25 pages.
U.S. Appl. No. 14/470,007, filed Sep. 5, 2014, Final Office Action mailed Feb. 22, 2016, 37 pages.
U.S. Appl. No. 14/591,474, filed Jan. 7, 2015, Non-Final Office Action mailed Feb. 12, 2016, 32 pages.
U.S. Appl. No. 14/494,079, filed Sep. 23, 2014, Preinterview first office action mailed Feb. 10, 2016, 6 pages.
U.S. Appl. No. 14/095,860, filed Dec. 3, 2013, Notice of Allowance mailed Oct. 19, 2015, 14 pages.
U.S. Appl. No. 13/942,451, filed Jul. 15, 2013, Non Final Office Action mailed Jan. 8, 2016, 41 pages.
U.S. Appl. No. 13/919,702, filed Jun. 17, 2013, Final Office Action mailed Dec. 31, 2015, 30 pages.
U.S. Appl. No. 14/071,613, filed Nov. 4, 2013, Final Office Action mailed Oct. 8, 2015, 11 pages.
U.S. Appl. No. 14/139,299, filed Dec. 23, 2013, Non Final Office Action mailed Aug. 14, 2015, 39 pages.
U.S. Appl. No. 14/470,392, filed Aug. 27, 2014, Non Final Office Action mailed Nov. 5, 2015, 31 pages.
U.S. Appl. No. 14/470,415, filed Aug. 27, 2014, Non Final Office Action mailed Nov. 18, 2015, 28 pages.
U.S. Appl. No. 14/139,299, filed Dec. 23, 2013, Non Final Office Action mailed Jun. 20, 2016, all pages.
U.S. Appl. No. 14/470,279, filed Aug. 27, 2014, Non Final Office Action mailed Jul. 19, 2016, all pages.
U.S. Appl. No. 14/479,007, filed Sep. 5, 2014, Non-Final Office Action mailed Jul. 27, 2016, 37 pages.
U.S. Appl. No. 13/942,451, filed Jul. 15, 2013 Final Office Action mailed Jun. 22, 2016, all pages.

(56) References Cited

OTHER PUBLICATIONS

U.S. Appl. No. 13/919,702, filed Jun. 17, 2013 Non Final Office Action mailed Jun. 30, 2016, all pages.
U.S. Appl. No. 14/470,392, filed Aug. 27, 2014 Non-Final Office Action mailed Aug. 5, 2016, all pages.
U.S. Appl. No. 14/470,415, filed Aug. 27, 2014 Non Final Office Action mailed Jul. 29, 2016, all pages.
U.S. Appl. No. 14/470,248, filed Aug. 27, 2014, Non Final Office Action mailed Jul. 25, 2016, all pages.

* cited by examiner

BROADCAST CONTENT RESUME REMINDER

CROSS-REFERENCE TO RELATED APPLICATION

This application claims priority to U.S. provisional application 61/793,297, filed 15 Mar. 2013, entitled "BROADCAST CONTENT RESUME REMINDER," the entire disclosure of which is hereby incorporated by reference for all purposes.

BACKGROUND

Television viewers have come to expect that their television receivers offer a number of robust and useful features.

SUMMARY

Systems, devices, and methods, for reminding television viewers what or which particular broadcast programming they were watching prior to changing channels to other broadcast programming when a commercial break occurs during the particular broadcast programming

DETAILED DESCRIPTION

Figure 1:
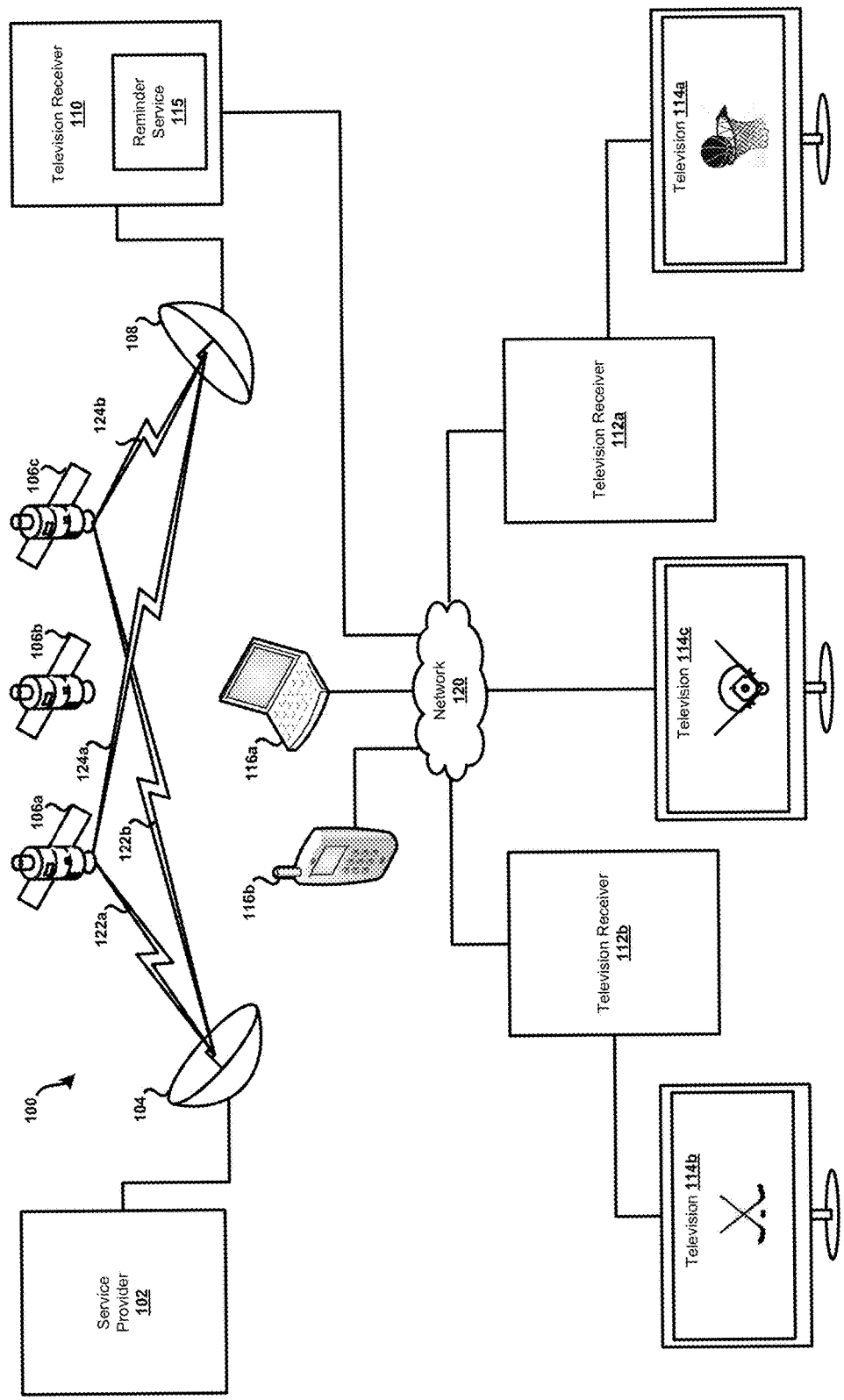
FIG. 1 shows an example media content distribution system.

The present disclosure is directed to systems, devices, and methods, for reminding television viewers what or which particular broadcast programming they were watching prior to "surfing" other broadcast programming when a commercial break occurs during the particular broadcast programming. Often, television viewers may flip through channels during commercial breaks, sometime referred to as "channeling-up" or "channeling-down." They may then forget what channel or programming they were watching prior to channel surfing.

In some embodiments, a television receiver may detect that a viewer has settled-in to watching particular programming, such as "The Daily Show" for example, because the television receiver has been tuned to the particular programming for a predetermined and configurable period of time, such as 5 consecutive minutes, or 10 consecutive minutes, etc. The television receiver may detect that, during a commercial break, the viewer has entered into a surf mode which may generally include changing to the channel to another single particular channel, or changing the channel an arbitrary number times via multiple channeling-up and/or channeling-down actions. There are many ways by which the television receiver may detect this. For example, the television receiver may count the number of channel changes within a predetermined period of time (e.g., 1 second, 5 second, 30 seconds, 60 seconds, etc.), compare the number of channel changes (e.g., 3 channel changes) to a predetermined and configurable threshold (e.g., 2 channel changes), and then determine the viewer has entered into the surf mode when the number of channel changes is greater than or at least equal to the predetermined threshold. Many other embodiments are possible. For example, the television receiver may detect a single channel change and make a determination that the viewer has entered into a surf mode Assuming that the viewer has entered the surf mode, the television receiver may detect that the commercial break is coming to an end, and then output for presentation by a display device a "pop-up" or notification that reminds the viewer that they were tuned to the particular programming prior to entering the surf mode. The notification may further include a "return" button and a "cancel" button. In this example, when the viewer selects the return button, the television receiver may automatically tune back to the particular programming, and then output for presentation by the display device the particular programming. When the viewer selects the cancel button, the notification may be removed from display, and the television viewer may continue to select other particular programming for viewing as desired. In this manner, the viewer may be provided an option to return to the particular programming for viewing, so that the viewer does not miss any content. Although not so limited, an appreciation of the various aspects of the present disclosure may be understood in connection with the following discussion with reference to the drawings.

For example, in an aspect, a computer-implemented method includes identifying, by a television receiver, user-interest in particular broadcast programming. In some embodiments, identifying user-interest in the particular broadcast programming is achieved by detecting output of the particular broadcast programming to a display device for a predetermined and configurable time period. For example, the television receiver may be programmed to deduce user-interest in the particular broadcast programming when the television receiver outputs the particular broadcast programming to the display device for a time period greater than or equal to about 45 seconds, greater than or equal to about 60 seconds, greater than or equal to about 2 minutes, and etc. In these examples, the amount of time the particular broadcast programming is estimated as having been watched is used as an indicator to determine whether or not a user or viewer is interested in the particular broadcast programming. Other embodiments are possible.

In some embodiments, the method also includes detecting, by the television receiver during a commercial break, a channel change event from a channel associated with the particular broadcast programming to a different channel, and monitoring, by the television receiver, status of the commercial break in response to detection of the channel change event. In general, the channel change event may include many channeling events, such as a first channeling event that includes switching from the channel associated with the particular broadcast programming to the different channel, and then a subsequent second channeling event that includes switching from the different channel to still another different channel. However, in some embodiments, detection of the first channeling event alone is sufficient to trigger the television receiver to monitor status of the commercial break. In some embodiments, the method also includes allocating a particular tuner of the television receiver for monitoring status of the commercial break in response to detection of the channel change event, and monitoring status of the commercial break by detection of timing information within a broadcast data stream of the channel associated with the particular broadcast programming.

Such an implementation may be realizable at least in a multi-tuner television receiver implementation, whereby a particular one of the tuners may be "parked" on a particular satellite transponder associated with the particular broadcast programming so that television receiver at all times during the channel change event is tuned-in to the particular broadcast programming, so that the television receiver can monitor status of the commercial break. In this example, metadata (e.g., timing tags) embedded within the signal associated with particular broadcast programming may be detected by the television receiver at least during the commercial break. The metadata may generally include timing information so that the television receiver can determine when the commercial break is going to end, and broadcast of the particular broadcast programming will resume. For example, a particular timing tag embedded within the signal may provide an indication that the commercial break is going to end in about 15 seconds, about 30 seconds, about 60 seconds, and etc. It will be appreciated that timing tags may be embedded within the signal as desired, and additionally in any particular frequency (e.g., 1 tag per second) as desired.

In some embodiments, the method also includes outputting, by the television receiver for presentation by a display device, an interface that indicates ending of the commercial break, and outputting, by the television receiver for presentation by the display device, the particular broadcast programming when an indication of user-selection of a particular icon within the interface is detected by the television receiver. In some embodiments, the television receiver may output the interface that indicates ending of the commercial break at a predetermined and configurable time prior to ending of the commercial break. For example, the television receiver may be programmed to, based upon detection of the above-mentioned timing tags, output the interface that indicates ending of the commercial break at about 10 seconds, at about 30 seconds, at about 60 seconds, and etc., prior to ending of the commercial break, whereby an increase in time may generally be analogous to providing an increase in advance warning of the end of the commercial break. This may be preferable in many instances so that a viewer may generally be assured to not miss any of the particular broadcast programming once the commercial break has ended.

In another aspect, computer-implemented method includes activating, by a television receiver, a timer in response to detection of a channeling event during a commercial break from a channel associated with particular programming to a different channel, outputting, by the television receiver for presentation by a display device, an interface in response to expiration of the timer that indicates an upcoming ending of the commercial break and continuation in broadcast of the particular programming, and outputting, by the television receiver for presentation by the display device, the particular programming when an indication of user-selection of a particular icon within the interface is received.

Such an implementation may be realizable at least in a single-tuner television receiver implementation, whereby the television receiver may not necessarily be able to allocate a particular tuner to be parked on a particular satellite transponder associated with the particular broadcast programming so that television receiver at all times during the channel change event is tuned-in to the particular broadcast programming, so that the television receiver can monitor status of the commercial break. Instead, the timer may be used to estimate status of the commercial break, and when the timer expires the television receiver may output an interface that indicates ending of the commercial break in a manner similar to that described above. In some embodiments, the method also includes setting the timer to a particular duration based on type of the particular programming. In some embodiments, the methods also includes setting the timer to a particular duration based on geographic region of service of the channel associated with the particular programming.

In these examples, the timer may thus be set to a particular duration based on one or more factors. An example of type(s) of the particular programming may include a situational comedy, reality television show, news program, and etc., and it will be appreciated that timing of commercial or advertising content may vary when comparing a situational comedy with a news program, for example, and also depending upon where in the world the particular programming is broadcast. For example, in the United Kingdom, a 30 minute episode of a situational comedy may include 2 commercial breaks each of 5 minute duration, yet a 30-minute news program may include 4 commercial breaks each of 4 minute duration. In contrast, in the United States, a 30 minute episode of a situational comedy may include 4 commercial breaks each of 3.5 minute duration, yet a 30-minute news program may include 3 commercial breaks each of 2.5 minute duration. Accordingly, the timer may be set to a particular duration based on one or more factors that may include type of the particular programming, as well as geographic region of service of the channel associated with the particular programming. It will be appreciated that many other embodiments are possible as well, and additionally that the examples provided are examples only, and may vary based on implementation-specific details.

In some embodiments, the method also includes monitoring channeling events from the channel associated with particular programming to different channels in response to detection of user-interest in the particular programming. Additionally or alternatively, the method includes identifying user-interest in the particular programming by detecting output of the particular programming by the television receiver to the display device for a predetermined and configurable time period. In these example, whether or not a viewer is interested in particular content may be deduced by an estimation of how long the viewer has been watching (or at least the television receiver is tuned-to) the particular programming. Such an implementation is discussed throughout, where the television receiver may be programmed by default or customization to estimate that the viewer is interested in the particular programming. For example, the television receiver may be programmed to make a determination that a viewer is interested in the particular programming when the particular programming is output by the television receiver for about 60 seconds, about 120 seconds, about 180 seconds, about 200 seconds, and etc., prior to ending of the commercial break. Many other embodiments are possible as well.

In some embodiments, the method also includes detecting selection of the particular icon within the interface, and outputting the particular programming for presentation by the display device. In other embodiments, the methods also includes detecting selection of another particular icon within the interface, and outputting programming other the particular programming for presentation by the display device. In these examples, the interface provides an option whereby a viewer may direct the television receiver to return to the particular programming prior to the ending of the commercial break, so that the viewer does not miss any of the particular programming. In other embodiments, the viewer may in fact not be concerned with returning to the particular programming and instead may dismiss the interface to continue watching whatever content is currently output by the television receiver to a presentation device for display thereon.

In general, a television receiver may configured to implement any of one or more of the various features or aspects as discussed throughout the present disclosure. For example, a television receiver comprising one or more processors, one or more tuners, and a memory communicatively coupled with and readable by the one or more processors and having stored therein processor-readable instructions that, when executed by the one or more processors, causes the one or more processors to evaluate status of a commercial break in particular programming in response to detection of a channel change event from a channel associated with the particular programming to a different channel, and output for presentation by a display device an interface that indicates an upcoming end to the commercial break and that provides an icon that when selected switches back to the channel associated with the particular programming.

Additionally, or alternatively, the memory has stored therein processor-readable instructions which, when executed by the one or more processors, cause the one or more processors to allocate a particular one of the tuners for monitoring status of the commercial break in response to detection of the channel change event. Additionally, or alternatively, the memory has stored therein processor-readable instructions which, when executed by the one or more processors, cause the one or more processors to activate a timer in response to detection of the channel change event, and output the interface for presentation by the display device in response to expiration of the timer. Additionally, or alternatively, the memory has stored therein processor-readable instructions which, when executed by the one or more processors, cause the one or more processors to detect selection of the particular icon within the interface, and output the particular programming for presentation by the display device. Additionally, or alternatively, the memory has stored therein processor-readable instructions which, when executed by the one or more processors, cause the one or more processors to detect selection of another particular icon within the interface, and output programming other the particular programming for presentation by the display device. In this manner, the television receiver may configured to implement any of one or more of the various features or aspects as discussed throughout the present disclosure, as described in further detail below in connection with FIGS. 1-6.

For example, referring now to FIG. 1 an example media content distribution system 100 is shown in which aspects of the present disclosure may be implemented. For brevity, the system 100 is depicted in a simplified and conceptual form, and may generally include more or fewer systems, devices, networks, and/or other components as desired. Further, number and type of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system.

The example system 100 may include a service provider 102, a satellite uplink 104, a plurality of orbiting (e.g., geosynchronous) satellites 106a-c, a satellite dish 108, a PTR (Primary Television Receiver) 110, a plurality of secondary television receivers 112a-b, a plurality of televisions 114a-c, and a plurality of computing devices 116a-b. In some embodiments, the PTR 110 may include a reminder service 115 configured to or for reminding television viewers what or which particular broadcast programming they were watching prior to surfing other broadcast programming when a commercial break occurs during the particular broadcast programming, as discussed in further detail below.

The system 100 may also include at least one network 120 that establishes a bi-directional communication path for data transfer between and among the PTR 110, secondary television receivers 112a-b, televisions 114a-c, and computing devices 116a-b of the example system 100. In some embodiments, the network 120 may further establish a bi-directional communication path (not shown) for data transfer between the PTR 110 and the service provider 102. The network 120 is intended to represent any number of terrestrial and/or non-terrestrial network features or elements. For example, the network 120 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, and/or any other type of communication network(s) configured such that data may be transferred between and among respective elements of the example system 100.

The PTR 110, and the secondary television receivers 112a-b, as described throughout may generally be any type of television receiver, such as a STB (Set Top Box) for example. In another example, the PTR 110, and the secondary television receivers 112a-b, may exhibit functionality integrated as part of or into a television, a DVR, a computing device, such as a tablet computing device, or any other computing system or device, as well as variations thereof. Further, the PTR 110 and the network 120, together with the secondary television receivers 112a-b, televisions 114a-c, and computing devices 116a-b, may form at least a portion of a particular home computing network, and may each be respectively configured such as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc.

In practice, the satellites 106a-c may be configured to receive uplink signals 122a-b from the satellite uplink 104. In this example, the uplink signals 122a-b may contain one or more transponder streams of particular data or content, such as particular television channel, that is supplied by the service provider 102. For example, each of the respective uplink signals 122a-b may contain various media content such a plurality of encoded HD (High Definition) television channels, various SD (Standard Definition) television channels, on-demand programming, programming information, and/or any other content in the form of at least one transponder stream, and in accordance with an allotted carrier frequency and bandwidth. In this example, different media content may be carried using different ones of the satellites 106a-c. Further, different media content may be carried using different transponders of a particular satellite (e.g., satellite 106a); thus, such media content may be transmitted at different frequencies and/or different frequency ranges. For example, a first and second television channel may be carried on a first carrier frequency over a first transponder of satellite 106*a*, and a third, fourth, and fifth television channel may be carried on second carrier frequency over a first transponder of satellite 106*b*, or, the third, fourth, and fifth television channel may be carried on a second carrier frequency over a second transponder of satellite 106*a*, and etc.

The satellites 106*a*-*c* may further be configured to relay the uplink signals 122*a*-*b* to the satellite dish 108 as downlink signals 124*a*-*b*. Similar to the uplink signals 122*a*-*b*, each of the downlink signals 124*a*-*b* may contain one or more transponder streams of particular data or content, such as various encoded and/or at least partially electronically scrambled television channels, on-demand programming, etc., in accordance with an allotted carrier frequency and bandwidth. The downlink signals 124*a*-*b*, however, may not necessarily contain the same or similar content as a corresponding one of the uplink signals 122*a*-*b*. For example, the uplink signal 122*a* may include a first transponder stream containing at least a first group or grouping of television channels, and the downlink signal 124*a* may include a second transponder stream containing at least a second, different group or grouping of television channels. In other examples, the first and second group of television channels may have one or more television channels in common. In sum, there may be varying degrees of correlation between the uplink signals 122*a*-*b* and the downlink signals 124*a*-*b*, both in terms of content and underlying characteristics.

Continuing with the example implementation scenario, the satellite dish 108 may be provided for use to receive television channels, such as on a subscription basis, provided by the service provider 102, satellite uplink 104, and/or satellites 106*a*-*c*. For example, the satellite dish 108 may be configured to receive particular transponder streams, or downlink signals 124*a*-*b*, from one or more of the satellites 106*a*-*c*. Based on the characteristics of the PTR 110 and/or satellite dish 108, however, it may only be possible to capture transponder streams from a limited number of transponders concurrently. For example, a tuner of the PTR 110 may only be able to tune to a single transponder stream from a transponder of a single satellite, such as satellite 106*a*, at a time.

Additionally, the PTR 110, which is communicatively coupled to the satellite dish 108, may subsequently select via tuner (see e.g., FIG. 3), decode, and relay particular transponder streams to the television 114*c* for display thereon. For example, the satellite dish 108 and the PTR 110 may, respectively, be configured to receive, decode, and relay at least one premium HD-formatted television channel to the television 114*c*. Programming or content associated with the HD channel may generally be presented live, or from a recording as previously stored on, by, or at the PTR 110. In this example, the HD channel may be output to the television 114*c* in accordance with the HDMI/HDCP content protection technologies. Other embodiments are possible. For example, in some embodiments, the HD channel may be output to the television 114*c* in accordance with the MoCA® (Multimedia over Coax Alliance) home entertainment networking standard. Still other embodiments are possible.

Further, the PTR 110 may select via tuner, decode, and relay particular transponder streams to one or both of the secondary television receivers 112*a*-*b*, which may in turn relay particular transponder streams to a corresponding one of the television 114*a* and the television 114*a* for display thereon. For example, the satellite dish 108 and the PTR 110 may, respectively, be configured to receive, decode, and relay at least one television channel to the television 114*a* by way of the secondary television receiver 112*a*. Similar to the above-example, the television channel may generally be presented live, or from a recording as previously stored on the PTR 110, and may be output to the television 114*a* by way of the secondary television receiver 112*a* in accordance with a particular content protection technology and/or networking standard. Other embodiments are possible.

Still further, the satellite dish 108 and the PTR 110 may, respectively, be configured to receive, decode, and relay at least one premium television channel to one or both of the computing devices 116*a*-*b*. Similar to the above-examples, the television channel may generally be presented live, or from a recording as previously stored on the PTR 110, and may be output to one or both of the computing devices 116*a*-*b* in accordance with a particular content protection technology and/or networking standard. Other embodiments are possible.

Figure 2:
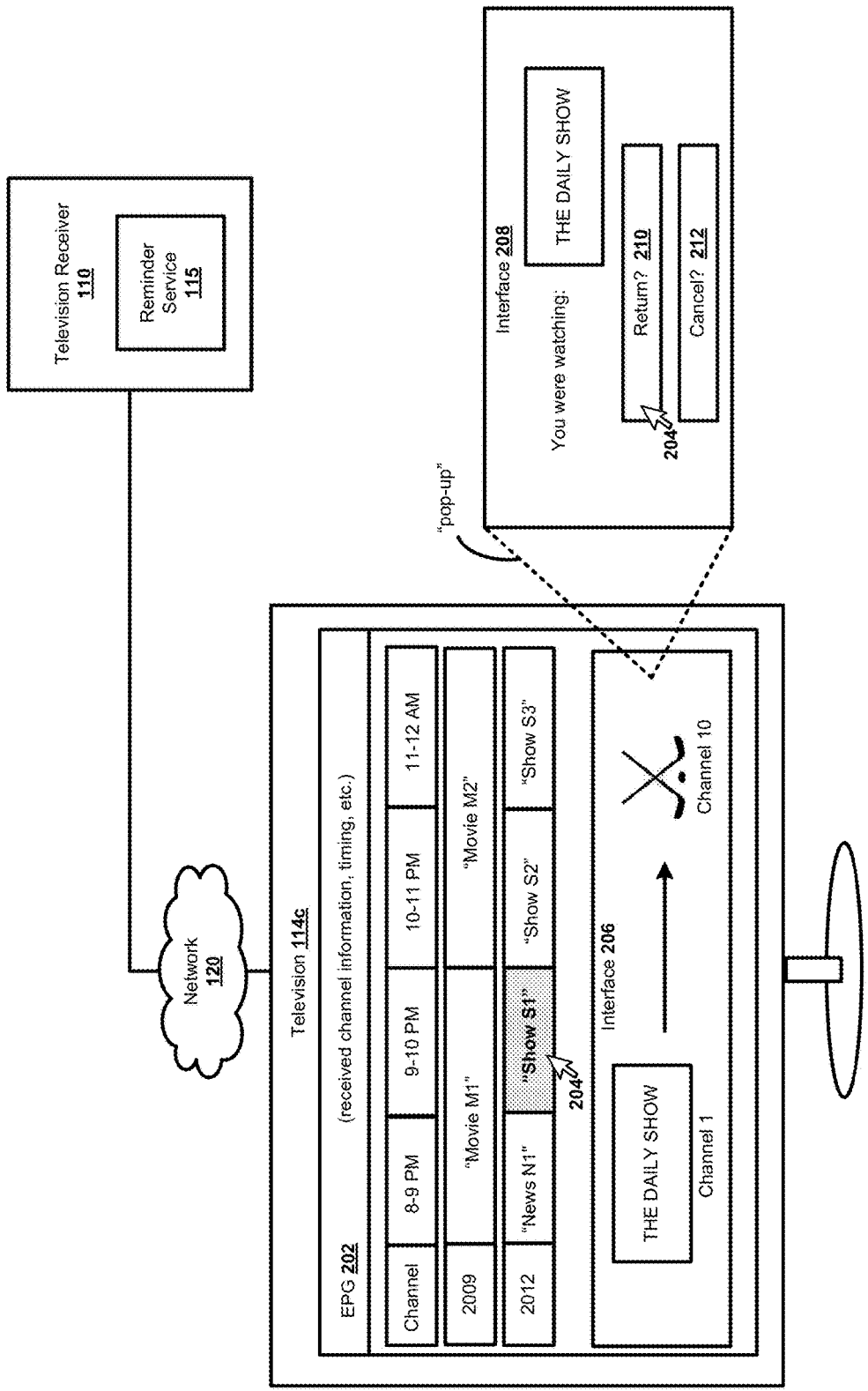
FIG. 2 shows aspects of the example system of FIG. 1 in further detail.

Referring now to FIG. 2, aspects of the example system 100 of FIG. 1 are shown in further detail. In particular, the PTR 110 may be configured to output an EPG (Electronic Programming Guide) 202 to and for presentation by at least the television 114*c*. The EPG 202 may at least present various information related to television channels and the timing of programs or programming appearing on such television channels, such as television channels as received from one or more of the satellites 106*a*-*c*. For example, the EPG 202 may display channel information associated with a channel "2012," where a "Show S1" is listed as scheduled to appear on the channel "2012" during a particular time period "9-10 PM" of a particular day, etc. In this example, and assuming that a current time is sometime during the time period "9-10 PM" of a particular day, a user may manipulate a cursor 204 using a pointing device (not shown) to select the "Show S1" for immediate viewing on the television 114*c*. Other embodiments are possible. For example, it is envisioned that any means consistent with menu-driven navigation may be used to interact with the EPG 202, and respective elements of the EPG 202.

As mentioned above, oftentimes television viewers may flip channels during commercial breaks. A first interface 206 as shown in FIG. 2 is intended to illustrate or show that a viewer has surfed through eight different consecutive channels during a commercial break of The Daily Show, eventually arriving at a channel broadcasting a sporting event. It will be appreciated that other "channeling" events are possible, where the changing of channels need not necessarily be consecutive, or in a particular direction (e.g., increasing in number from a lower numbered channel to a greater numbered channel). In some embodiments, the PTR 110 may have detected that the viewer has settled-in to The Daily Show, because the PTR 110 may have been tuned to The Daily Show for a predetermined and configurable period of time, such as 3 consecutive minutes, 8 consecutive minutes, etc. The PTR 110 may detect that, during the commercial break, the viewer has entered into a surf mode because the viewer has surfed the through eight different channels over a period of about 5 seconds, or about 10 seconds, etc. Many other embodiments are possible as well. For example, the timing of a channeling event need not necessarily be considered. For example, the PTR 110 may detect that, during the commercial break, the viewer has entered into a surf mode because the viewer has simply changed the channel from the Daily Show to other difference programming on a different channel.

In example embodiments, the PTR 110 may detect that the commercial break is coming to an end, and then output for presentation by the television 114*c* a notification 208 that reminds the viewer that they were tuned to The Daily Show prior to entering the surf mode. The notification 208 may further include a return button 210 and a cancel button 212. In this example, when the viewer selects the return button 210, the PTR 110 may automatically tune back to The Daily Show, and then output for presentation by the television 114*c* The Daily Show for viewing by the viewer. When the viewer selects the cancel button 212, however, the notification 208 may be removed from the interface 206, and the viewer may continue to select other particular programming for viewing as desired, or continue watching the sporting event as intended to be depicted in FIG. 2.

Figure 3:
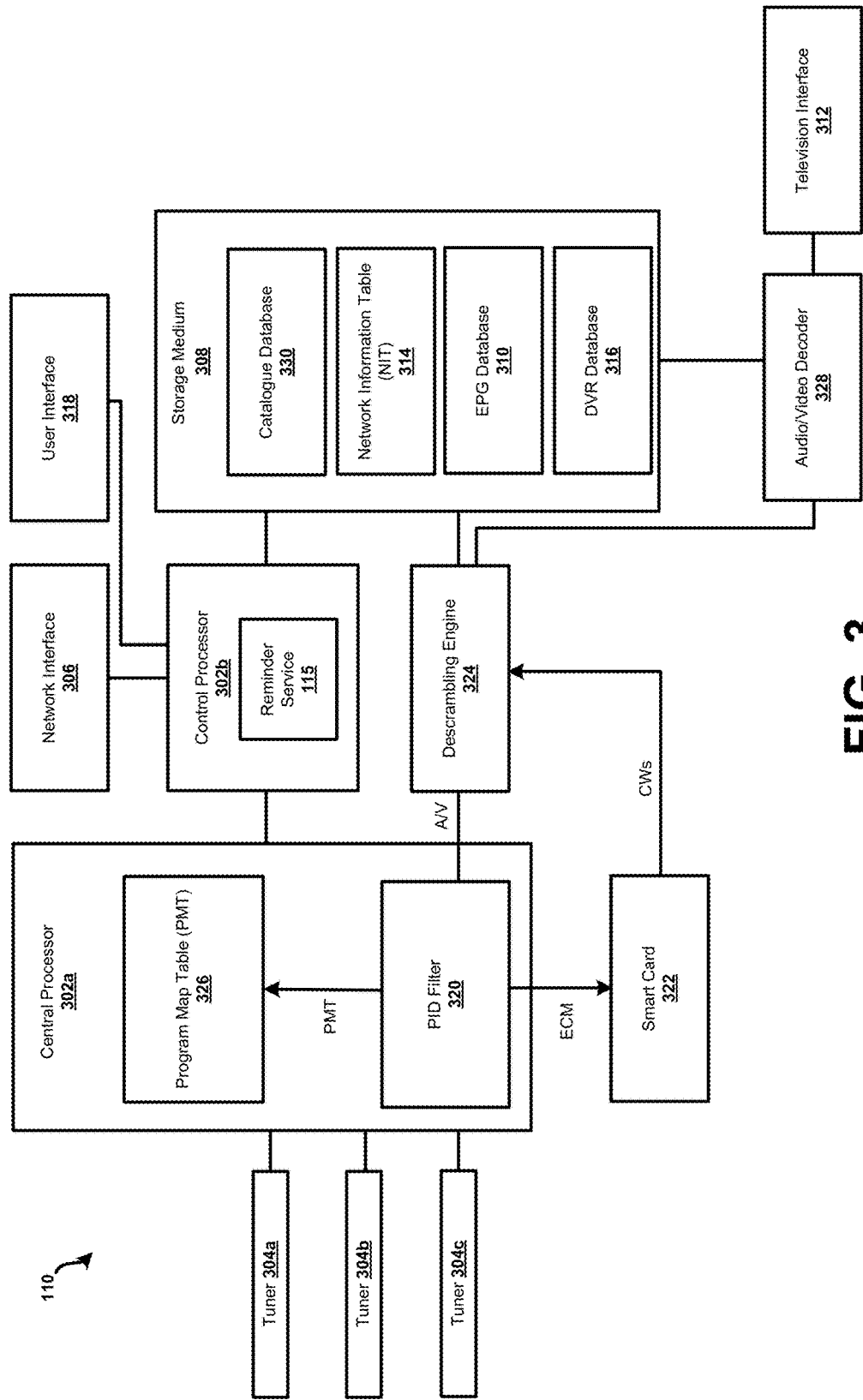
FIG. 3 shows a simplified block diagram of a television receiver of FIG. 1.

Referring now to FIG. 3, a simplified block diagram of the PTR 110 of FIG. 1 is shown in accordance with the present disclosure. In some embodiments, at least one of the secondary television receivers 112*a-b* may be configured in a manner similar to that of the PTR 110. In other embodiments, at least one of the secondary television receivers 112*a-b* may be configured to exhibit a reduced functionality as compared to the PTR 110, and may depend at least to a certain degree on the PTR 110 to implement certain features or functionality. In this example, the secondary television receivers 112*a-b* may be referred to as a "thin client."

For brevity, the PTR 110 is depicted in a simplified and conceptual form, and may generally include more or fewer elements or components as desired in accordance with the present disclosure. Additionally, although not explicitly shown in FIG. 3, the PTR 110 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such a functionality. Additionally, the PTR 110 may be configured to include any number of other various components or logical modules that are implemented in hardware, software, firmware, or any combination thereof, and such components or logical modules may or may not be implementation-specific.

In some embodiments, the PTR 110 and/or the secondary television receivers 112*a-b* comprise of a STB. In addition to being in the form of an STB, at least the PTR 110 may be incorporated into another device, such as the television 114*c*. For example, the television 114*c* may have an integrated television receiver that does not involve an external STB being coupled with the television 114*c*. A STB may contain some or all of the components of the PTR 110 and/or may be able to perform some or all of the functions of the PTR 110. Accordingly, instances in this document referring to a STB, and steps being performed by a STB, may also be performed, more generally, by the PTR 110 and/or secondary television receivers 112*a-b*.

Referring still to FIG. 3, the PTR 110 may include the reminder service 115 configured to or for reminding television viewers what or which particular broadcast programming they were watching prior to "surfing" other broadcast programming when a commercial break occurs during the particular broadcast programming in accordance with the present disclosure, at least one processor 302, including a central processor 302*a* and a control processor 302*b*, a plurality of tuners 304*a-c*, at least one network interface 306, at least one non-transitory computer-readable storage medium 308, at least one EPG database 310, at least one television interface 312, at least one NIT (Networking Information Table) 314, at least one DVR database 316, at least one user interface 318, at least one PID filter 320, at least one smart card 322, at least one descrambling engine 324, at least one PMT (Program Map Table) 326, at least one decoder 328, and a catalogue database 330. In other embodiments of the PTR 110, fewer or greater numbers of components may be present. Further, functionality of one or more components may be combined; for example, functions of the descrambling engine 324 may be performed by the central processor 302*a*. Still further, functionality of components may be spread among additional components. For example, the PID filter 320 may be handled by hardware and/or software separate from the PMT 326.

The processor 302 may include one or more specialized and/or general-purpose processors configured to perform processes such as tuning to a particular channel, accessing and displaying EPG information from the EPG database 310, and/or receiving and processing input from a user. For example, processor 302 may include one or more processors dedicated to decoding video signals from a particular format, such as MPEG (Moving Picture Experts Group), for output and display on a television and for performing decryption.

The control processor 302*b* may communicate with the central processor 302*a*. The control processor 302*b* may control the recording of television channels based on timers stored in the DVR database 316. The control processor 302*b* may initiate recording of a television channel by sending a record command along with an indication of the television channel to be recorded to the central processor 302*a*. The control processor 302*b* may not send a second record command, when additional recording is to begin at the same time, until an acknowledgement that recording of the first television channel has successfully been received and initiated by the central processor 302*a*. The control processor 302*b* may also provide commands to the central processor 302*a* when recording of a television channel is to cease. In addition to providing commands relating to the recording of television channels, the control processor 302*b* may provide commands to the central processor 302*a* that indicate television channels to be output to the decoder 328 for output to a presentation device, such as the television 114*c* for example. The control processor 302*b* may also communicate with the network interface 306 and the user interface 318. The control processor 302*b* may handle in-coming data from the network interface 306 and the user interface 318. Additionally, the control processor 302*b* may be configured to output data via the network interface 306.

The tuners 304*a-c* may be used to tune to television channels, such as television channels transmitted via satellite or cable, such as satellites 106*a-c*. Each respective one of the tuner 304*a-c* may be capable of receiving and processing a single stream of data from a satellite transponder, or a cable RF channel, at a given time. As such, a single tuner may tune to a single transponder or, for a cable network, a single cable RF channel. Additionally, one tuner (e.g., tuner 304*a*) may be used to tune to a television channel on a first transponder stream for display using a television, while another tuner (e.g., tuner 304*b*) may be used to tune to a television channel on a second transponder for recording and viewing at some other time. Still another tuner (e.g., tuner 304*c*) may be used to check various television channels to determine if they are available or not. If multiple television channels transmitted on the same transponder stream are desired, a particular tuner (e.g., tuner 304*a*) may be used to receive the signal containing the multiple television channels for presentation and/or recording. The tuners 304*a-c* may receive commands from the central processor 302a. Such commands may instruct the tuners 304a-c which frequencies are to be used for tuning.

The network interface 306 may be used to communicate via an alternate communication channel with a television service provider. For example, the primary communication channel may be via satellite, which may be unidirectional to the STB, and the alternate communication channel, which may be bi-directional, may be via a network, such as the Internet. The PTR 110 may be able to communicate with the service provider 102 of FIG. 1 via a network, such as the Internet. This communication may be bidirectional. For example, data may be transmitted from the PTR 110 to the service provider 102, and from the service provider 102 to the PTR 110. The network interface 306 may be configured to communicate via one or more networks, such as the Internet, to communicate with the service provider 102. Information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. The storage medium 308 may store information related to the EPG database 310, the NIT 314, and/or the DVR database 316. Recorded television programs may be stored using the storage medium 308. The storage medium 308 may be partitioned or otherwise divided such that predefined amounts of the storage medium 308 are devoted to storage of omnibus channel files and user-selected television programs.

The EPG database 310 may store information related to television channels and the timing of programs appearing on such television channels. The EPG database 310 may be stored using the storage medium 308, which may be a hard drive. Information from the EPG database 310 may be used to inform users of what television channels or programs are popular and/or provide recommendations to the user. Information from the EPG database 310 may provide the user with a visual interface (e.g., EPG 202) displayed by a television that allows a user to browse and select television channels and/or television programs for viewing and/or recording. Information used to populate the EPG database 310 may be received via the network interface 306 and/or via satellites, such as satellites 106a-c of FIG. 1 via the tuners 304a-c. For instance, updates to the EPG database 310 may be received periodically via satellite. The EPG database 310 may serve as an interface for a user to control DVR functions of the PTR 110, and/or to enable viewing and/or recording of multiple television channels simultaneously.

In addition to being used to provide users with information about scheduled programming, information from the EPG database 310 may be used to determine when television programs begin and end for the purposes of recording. For instance, when a channel-specific file is recorded that contains multiple television channels, the start and end of time of specific television programs within the channel-specific file may be based on the start and end times indicated in the EPG database 310. Other data may be stored within the EPG database 310 that may be useful in managing channel-specific files, such as series identifiers and episode identifiers, which may be used by a television service provider to identify particular television programs.

The decoder 328 may serve to convert encoded video and audio into a format suitable for output to a display device. For instance, the decoder 328 may receive MPEG video and audio from the storage medium 308, or the descrambling engine 324, to be output to a television. MPEG video and audio from the storage medium 124 may have been recorded to the DVR database 316 as part of a previously-recorded television program. The decoder 328 may convert the MPEG video and audio into a format appropriate to be displayed by a television or other form of display device and audio into a format appropriate to be output from speakers, respectively. The television interface 312 may serve to output a signal to a television, or another form of display device, in a proper format for display of video and playback of audio. As such, the television interface 312 may output one or more television channels, stored television programming from the storage medium 308, such as television programs from the DVR database 316 and/or information from the EPG database 310 for example, to a television for presentation.

The NIT 314 may store information used by the PTR 110 to access various television channels. The NIT 314 may be stored using the storage medium 308. Information used to populate the NIT 314 may be received via satellite, or cable, via the tuners 304a-c and/or may be received via the network interface 306 from a service provider. As such, information present in the NIT 314 may be periodically updated. The NIT 314 may be locally-stored by the PTR 110 using the storage medium 308. Information that may be present in the NIT 314 may include, for example: television channel numbers, a satellite identifier, a frequency identifier, a transponder identifier, an ECM (Entitlement Control Message) PID (Packet Identifier), one or more audio PIDs, and a video PID. A second audio PID of a channel may correspond to a SAP (Second Audio Program) program, such as in another language. In some embodiments, the NIT 314 may be divided into additional tables. For example, rather than the specific audio PIDs and video PIDs being present in the NIT 314, a channel identifier may be present within NIT 314 which may be used to look up the audio PIDs and video PIDs in another table, such as the PMT 326. For example, the PMT 326 may store information on audio PIDs and video PIDs for television channels that are transmitted on a transponder frequency.

Table 1 below provides a simplified example of the NIT 314 for several television channels. It should be understood that in other embodiments, many more television channels may be represented in the NIT 314. The NIT 314 may be at least periodically updated by a television service provider. As such, television channels may be reassigned to different satellites and/or transponders, and the PTR 110 may be able to handle this reassignment as long as the NIT 314 is updated.

TABLE 1

| Channel | Satellite | Transponder | ECM PID | PMT PID |
|---------|-----------|-------------|---------|---------|
| 4 | 1 | 2 | 27 | 1001 |
| 5 | 2 | 11 | 29 | 1002 |
| 7 | 2 | 3 | 31 | 1001 |
| 13 | 2 | 4 | 33 | 1004 |

Based on information in the NIT 314, it may be possible to determine the proper satellite and transponder to which to tune for a particular television channel. In some embodiments, the NIT 314 may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

It should be understood that the values provided in Table 1 are for example purposes only. Actual values, including how satellites and transponders are identified, may vary. Additional information may also be stored in NIT 314. Additional information on how the NIT 314, as indicated in Table 1, may be used is provided in reference to FIG. 3. The same PID may be reused on different transponders.

A DVR may permit a television channel to be recorded for a period of time. DVR functionality of the PTR 110 may be managed by the control processor 302*b*. The control processor 302*b* may coordinate the television channel, start time, and stop time of when recording of a television channel is to occur. The DVR database 316 may store information related to the recording of television stations. The DVR database 316 may store timers that are used by the control processor 302*b* to determine when a television channel should be tuned to and its programs recorded to the DVR database 316. However, other embodiments are possible. For example, in some embodiments, the storage medium 308 may store timers. Timer files may be defined as a daily_schedule_db.dat file and a gloal_timer_db.dat file. In general, when a "new" timer is created, a "new" entry may be added into the daily_schedule_db.dat and gloal_timer_db.dat files, which may include all timer related information such as channel number, start time, duration, etc. Further, a limited amount of the storage medium 308 may be devoted to the DVR database 316. Timers may be set by a service provider and/or one or more users of the PTR 110.

DVR functionality of the control processor 302*b* may have multiple modes. For example, DVR functionality of the control processor 302*b* may be configured to record individual television programs selected by a user to the DVR database 316. Using the EPG database 310, a user may select a particular television program. Based on the date, time period, and television channel indicated by the EPG database 310, the control processor 302*b* may record the associated television program to the DVR database 316. In another example, the DVR database 316 may be used to store recordings of predefined periods of time on one or more television channels. These predefined periods of time may include one or more television programs. For example, Primetime on a particular television network may be recorded each weekday night. Further, multiple television channels may be recorded for such predefined periods of time. Such recording of television channels for predefined periods of time may be defined by a television service provider (e.g., service provider 102).

As an example of this second mode of DVR functionality, a television service provider may configure the PTR 110 to record television programming on multiple, predefined television channels for a predefined period of time, on predefined dates. For instance, a television service provider may configure the PTR 110 such that television programming may be recorded from 7 PM to 10 PM on the NBC, ABC, CBS, and FOX networks each weeknight. When a television program is selected for recording by a user and is also specified for recording by the television service provider, the user selection may serve as an indication to save the television program for an extended time, beyond the time which the predefined recording would otherwise be saved.

Whether recording is performed based on a user-selected television program or selection by a television service provider, selection may result in storage by DVR database 316 being managed differently. Separate storage arrangements, such as separate partitions on the same storage device, may be allocated based on which entity designated the television program/channel for recording. As such, the DVR database 316 may use multiple storage arrangements, such as multiple partitions on the storage medium 225. Television programming recorded based on a television service provider selection may be stored on a first storage arrangement. Television programming recorded based on user selection may be stored on a second storage arrangement. Television programming on the first storage arrangement may automatically be deleted after a predefined period of time, such as two weeks. If a television program stored by the first storage arrangement is selected by a user (such as via a displayed EPG) to be saved, the television program may be transferred from the first storage arrangement to the second storage arrangement, such as when the television programming would otherwise be deleted from the first storage arrangement.

The user interface 318 may include a remote control, physically separate from PTR 110, and/or one or more buttons on the PTR 110 that allows a user to interact with the PTR 110. The user interface 318 may be used to select a television channel for viewing, view information from the EPG database 310, and/or program a timer stored to the DVR database 316 wherein the timer may be used to control the DVR functionality of the control processor 302*b*.

Referring back to tuners 304*a-c*, television channels received via satellite, or cable, may contain at least some scrambled data. Packets of audio and video may be scrambled to prevent unauthorized users, such as nonsubscribers, from receiving television programming without paying the television service provider. When one of the tuners 304*a-c* is receiving data from a particular transponder of a satellite, the transponder stream may be a series of data packets corresponding to multiple television channels. Each data packet may contain a PID, which, in combination with the NIT 314 and/or the PMT 326, can be determined to be associated with particular television channel. Particular data packets, referred to as ECMs may be periodically transmitted. ECMs may be associated with another PID and may be encrypted; the PTR 110 may use the smart card 322 to decrypt ECMs. Decryption of an ECM may only be possible when the user (e.g., PTR 110) has authorization to access the particular television channel associated with the ECM. When an ECM is determined to correspond to a television channel being stored and/or displayed, the ECM may be provided to the smart card 322 for decryption.

When the smart card 322 receives an encrypted ECM, the smart card 322 may decrypt the ECM to obtain some number of control words. In some embodiments, from each ECM received by the smart card 322, two control words are obtained. In some embodiments, when the smart card 322 receives an ECM, it compares the ECM to the previously received ECM. When the two ECMs match, the second ECM is not decrypted because the same control words would be obtained. In other embodiments, each ECM received by the smart card 322 is decrypted; however, when a second ECM matches a first ECM, the outputted control words will match; thus, effectively, the second ECM does not affect the control words output by the smart card 322. The smart card 322 may be permanently part of the PTR 110 or may be configured to be inserted and removed from PTR 110.

The central processor 302*a* may be in communication with the tuners 304*a-c* and the control processor 302*b*. The central processor 302*a* may be configured to receive commands from the control processor 302*b*. Such commands may indicate when to start/stop recording a television channel and/or when to start/stop causing a television channel to be output to a television. The central processor 302a may control the tuners 304a-c. The central processor 302a may provide commands to the tuners 304a-c that instruct the tuners which satellite, transponder, and/or frequency to tune to. From the tuners 304a-c, the central processor 302a may receive transponder streams of packetized data. As previously detailed, some or all of these packets may include a PID that identifies the content of the packet.

The central processor 302a may be configured to create at least one PID filter 320 that sorts packets received from the tuners 304a-c based on the PIDs. When a tuner is initially tuned to a particular frequency, such as a particular transponder of a satellite, a PID filter may be created based on a PID of PMT data. The PID of PMT data packets may be known because it is stored as part of the NIT 314. From the PMT data packets, the PMT 326 may be constructed by central processor 302a. Table 2 below provides an exemplary snapshot of a PMT. The PMT 326 may be specific to a particular transponder. As such, when tuning to a different transponder occurs, a new PMT may be created for the different transponder.

TABLE 2

| Channel | Video PID | 1st Audio PID | 2nd Audio PID |
|---------|-----------|---------------|---------------|
| 4 | 1003 | 2383 | 2119 |
| 5 | 2993 | 2727 | 2728 |
| 7 | 9238 | 1233 | 0129 |
| 13 | 0012 | 9348 | — |

Accordingly, based on the information present in the PMT 326, the audio and video PIDs for specific television channels may be identified. A television channel may have multiple audio PIDs due to a second audio program, which may be in a different language. It should be understood that the values provided in Table 2 are for example purposes only. Actual values may vary. Additional information or less information may also be stored in the PMT 326.

The PID filter 320 may be configured to filter data packets based on PIDs. In some embodiments, the PID filter 320 is created and executed by central processor 302a. In other embodiments, separate hardware may be used to create and execute multiple PID filters. Depending on a television channel selected for recording/viewing, a PID filter may be created to filter the video and audio packets associated with the television channel, based on the PID assignments present in the PMT 326. For example, when a transponder data stream includes multiple television channels, data packets corresponding to a television channel that is not desired to be stored or displayed by the user, may be ignored by PID filters. As such, only data packets corresponding to the one or more television channels desired to be stored and/or displayed may be filtered and passed to either the descrambling engine 324 or the smart card 322; other data packets may be ignored. For each television channel, a stream of video packets, a stream of audio packets, one or both of the audio programs, and/or a stream of ECM packets may be present, each stream identified by a PID. In some embodiments, a common ECM stream may be used for multiple television channels. Additional data packets corresponding to other information, such as updates to the NIT 314, may be appropriately routed by the PID filter 320. At a given time, one or multiple PID filters may be executed by the central processor 302a.

The descrambling engine 324 may use the control words output by the smart card 322 in order to descramble video and/or audio corresponding to television channels for storage and/or presentation. Video and/or audio data contained in the transponder data stream received by the tuners 304a-c may be scrambled. Video and/or audio data may be descrambled by descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage in the DVR database 316 and/or to the decoder 328 for output to a television or other presentation equipment via the television interface 312.

The catalog database 330 may be used by the PTR 110 to store information about television programs that are stored as part of a channel-specific file and in individual television program files. The catalog database 330 may be updated as television programs are recorded, transferred, and as files corresponding to television programming are deleted. Data stored in catalog database 270 may be used to locate television programs within a channel-specific file and a program-specific file.

For simplicity, the PTR 110 of FIG. 3 has been reduced to a block diagram; commonly known parts, such as a power supply, have been omitted. Further, some routing between the various modules of PTR 110 has been illustrated. Such illustrations are for exemplary purposes only. The state of two modules not being directly or indirectly connected does not indicate the modules cannot communicate. Rather, connections between modules of the PTR 110 are intended only to indicate possible common data routing. It should be understood that the modules of the PTR 110 may be combined into a fewer number of modules or divided into a greater number of modules. Further, the components of the PTR 110 may be part of another device, such as built into a television. Also, while the PTR 110 may be used to receive, store, and present television channels received via a satellite, it should be understood that similar components may be used to receive, store, and present television channels via a cable network.

Figure 4:
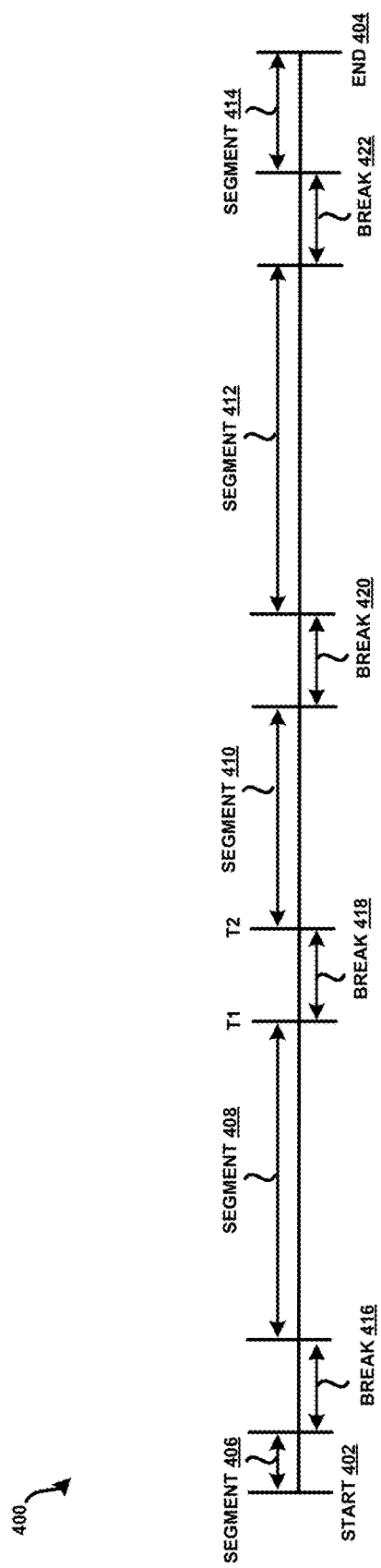
FIG. 4 shows an example broadcast program timeline.

Referring now to FIG. 4, an example broadcast program timeline 400 is shown in accordance with the present disclosure. The timeline 400 may for example be associated with a particular broadcast of The Daily Show. The timeline may include a start 402 and an end 404. Between the start 402 and the end 404, there may be a number of broadcast segments 406, 408, 410, 412, 414, and a number of commercial breaks 416, 418, 420, 422. As shown in FIG. 4, the broadcast segment 408 is greater in duration than the broadcast segment 406. For example, the broadcast segment 406 may correspond to an introductory segment of The Daily Show, and the broadcast segment 408 may correspond to an interview segment of The Daily Show. In practice, the PTR 110 as discussed above in connection with FIGS. 1-3 may be configured to analyze a broadcast stream associated with the particular broadcast of The Daily Show, and determine start and stop times of each of the commercial breaks 416, 418, 420, 422. For example, the PTR 110 may be configured to determine that the commercial break 418 starts precisely at time T1 and ends precisely at time T2.

In practice, the PTR 110 may be configured to take into account type and duration of the broadcast segments 406, 408, 410, 412, 414, in determining whether or not a viewer has settled-in to watching of particular programming. For example, during the broadcast segment 408, the PTR 110 may determine that the viewer has settled-in to watching The Daily Show in a manner similar to that described above in connection with FIG. 2. In contrast, because the broadcast segment 406 has a time duration much less the broadcast segment 408, the PTR 110 may determine that the viewer has settled-in to watching The Daily Show during the broadcast segment 406 when the PTR 110 has been tuned to The Daily Show for 51% of the duration of the broadcast segment 406. The value 51% is stated here for purpose of example only, and may be defined differently as desired. Further, that value may be defined differently for different shows. For example, that value may be defined differently for a news broadcast when compared to The Daily Show. Still other embodiments are possible.

Figure 5:
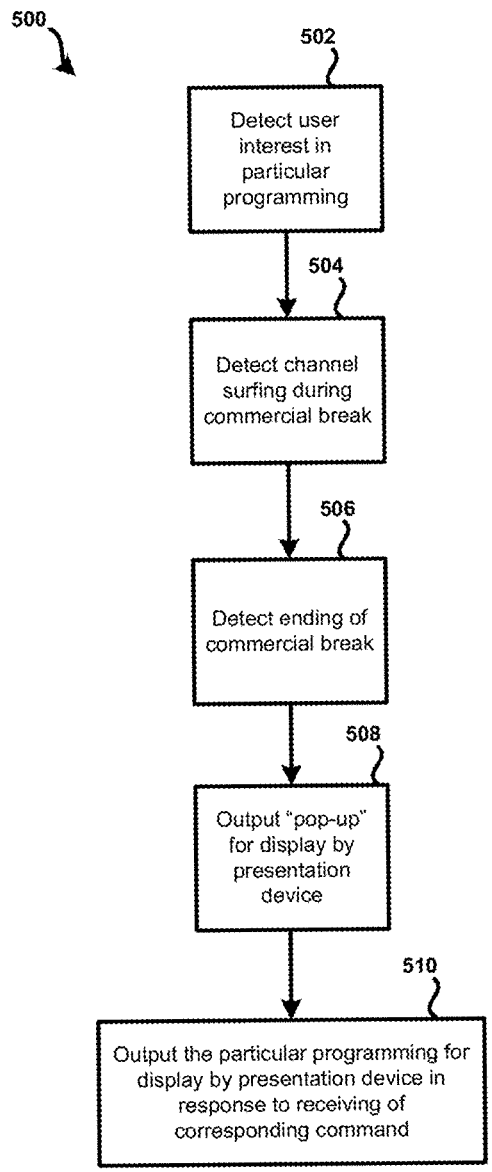
FIG. 5 shows an example method in accordance with the present disclosure.

Referring now to FIG. 5, an example method 500 is shown in accordance with the present disclosure. In general, steps or modules of the method 500 as described may ultimately be implemented by or on the PTR 110 of FIG. 1. For example, the reminder service 115 of or on the PTR 110 may be configured to implement one or more steps, modules, etc., of the example method 500. Other embodiments are however possible. For example, one or more modules or steps of the method 500 may be implemented by or on one or more of the other respective devices or components within the system 100 as described above in connection with FIG. 1. Still other embodiments are possible.

The method 500 may include detecting (module 502), by a television receiver, user or viewer interest in particular broadcast programming. For example, the television receiver may detect that a viewer has settled-in to The Daily Show, because the television receiver may have been tuned to a particular segment of the The Daily Show for a predetermined and configurable period of time, such as 30 seconds, 2 consecutive minutes, 7 consecutive minutes, etc. Other embodiments are possible.

The method 500 may include detecting (module 504), by a television receiver, user or viewer channel surfing during a commercial break of the particular broadcast programming. For example, the television receiver may detect, during a commercial break of The Daily Show, that a user or viewer has entered into a surf mode because the viewer has surfed through eight different channels over a period of about 4 seconds, or about 15 seconds, etc. Other embodiments are possible.

The method 500 may include detecting (module 506), by a television receiver, the forthcoming ending of the commercial break of the particular broadcast programming. For example, the television receiver may monitor the broadcast of a channel associated with The Daily Show upon detecting the user channel surfing (see module 504), and determine from underlying data (e.g., metadata) within the broadcast stream a precise start/stop time of the commercial break. Other embodiments are possible.

The method 500 may include outputting (module 508), by a television receiver, for presentation by a display device a pop-up that reminds the user or viewer that they were tuned to the particular programming prior to entering the surf mode (see module 504). For example, the television receiver may output for display by the television 114c the notification 208 as shown in FIG. 2, prior to ending of the commercial break of The Daily Show. Other embodiments are possible.

The method 500 may include outputting (module 510), by a television receiver, for presentation by the display device the particular broadcast programming associated with the original user or viewer interest (see module 502). For example, the television receiver may output for display by the television 114c The Daily Show in response to user selection of the return button 210 as shown within the notification 208 in FIG. 2. Other embodiments are possible.

Figure 6:
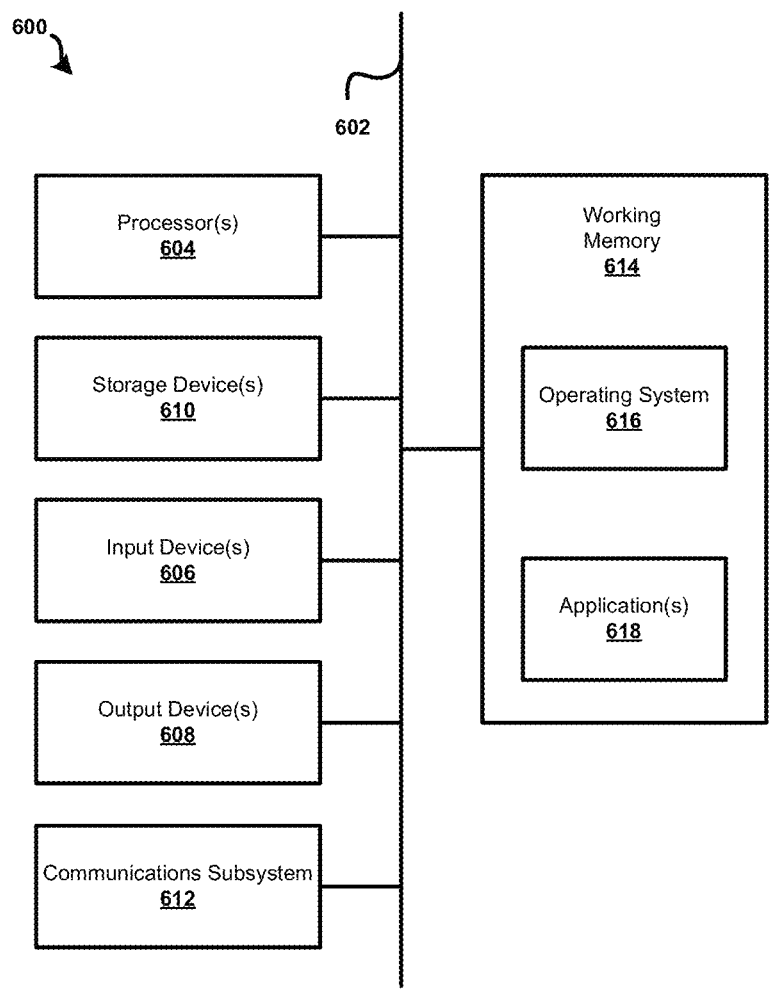
FIG. 6 shows an example computing system or device.

FIG. 6 shows an embodiment of an example computer system or device 600 in accordance with the present disclosure. An example of a computer system or device includes an enterprise server, blade server, desktop computer, laptop computer, personal data assistant, smartphone, gaming console, set-top-box, and any other type of machine for performing calculations. The computer system 600 may be wholly or at least partially incorporated as part of previously-described computing devices, such as the PTR 110, the secondary television receivers 112a-b, the televisions 114a-c, and the computing devices 116a-b of FIG. 1. The example computer device 600 may be configured to perform and/or include instructions that, when executed, cause the computer system 600 to perform the method of FIG. 5.

The computer device 600 is shown comprising hardware elements that may be electrically coupled via a bus 602 (or may otherwise be in communication, as appropriate). The hardware elements may include a processing unit with one or more processors 604, including without limitation one or more general-purpose processors and/or one or more special-purpose processors (such as digital signal processing chips, graphics acceleration processors, and/or the like); one or more input devices 606, which can include without limitation a remote control, a mouse, a keyboard, and/or the like; and one or more output devices 608, which can include without limitation a presentation device (e.g., television), a printer, and/or the like.

The computer system 600 may further include (and/or be in communication with) one or more non-transitory storage devices 610, which can comprise, without limitation, local and/or network accessible storage, and/or can include, without limitation, a disk drive, a drive array, an optical storage device, a solid-state storage device, such as a random access memory, and/or a read-only memory, which can be programmable, flash-updateable, and/or the like. Such storage devices may be configured to implement any appropriate data stores, including without limitation, various file systems, database structures, and/or the like.

The computer device 600 might also include a communications subsystem 612, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities (e.g., GSM, WCDMA, LTE, etc.), and/or the like. The communications subsystem 612 may permit data to be exchanged with a network (such as the network described below, to name one example), other computer systems, and/or any other devices described herein. In many embodiments, the computer system 600 will further comprise a working memory 614, which may include a random access memory and/or a read-only memory device, as described above.

The computer device 600 also can comprise software elements, shown as being currently located within the working memory 614, including an operating system 616, device drivers, executable libraries, and/or other code, such as one or more application programs 618, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 610 described above. In some cases, the storage medium might be incorporated within a computer system, such as computer system 600. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 600) to perform methods in accordance with various embodiments of the invention. According to a set of embodiments, some or all of the procedures of such methods are performed by the computer system 600 in response to processor 604 executing one or more sequences of one or more instructions (which might be incorporated into the operating system 616 and/or other code, such as an application program 618) contained in the working memory 614. Such instructions may be read into the working memory 614 from another computer-readable medium, such as one or more of the storage device(s) 610. Merely by way of example, execution of the sequences of instructions contained in the working memory 614 may cause the processor(s) 604 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 600, various computer-readable media might be involved in providing instructions/code to processor(s) 604 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 610. Volatile media may include, without limitation, dynamic memory, such as the working memory 614.

Example forms of physical and/or tangible computer-readable media may include a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 604 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 612 (and/or components thereof) generally will receive signals, and the bus 602 then might carry the signals (and/or the data, instructions, etc. carried by the signals) to the working memory 614, from which the processor(s) 604 retrieves and executes the instructions. The instructions received by the working memory 614 may optionally be stored on a non-transitory storage device 610 either before or after execution by the processor(s) 604.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   activating, by a television receiver, a timer in response to detection of a channel change event during a commercial break from a channel associated with particular programming to a different channel;
   determining, by the television receiver, a duration for the timer, wherein the duration is determined based on at least one of a type of the particular programming or a geographic region of service of the channel associated with the particular programming;
   outputting, by the television receiver, an interface for presentation by a display device, in response to expiration of the timer that indicates an upcoming ending of the commercial break and continuation in broadcast of the particular programming; and
   outputting, by the television receiver for presentation by the display device, the particular programming in response to user-selection of a particular icon within the interface.

2. The method of claim 1, further comprising:
   monitoring, by the television receiver, channel change events from the channel associated with particular programming to different channels in response to detection of user-interest in the particular programming.

3. The method of claim 2, wherein identifying the user-interest in the particular programming comprises:
   detecting, by the television receiver, that the particular programming has been output by the television receiver to the display device for at least a predetermined and configurable consecutive time period.

4. The method of claim 1, wherein the duration for the timer is determined based on the type of the particular programming.

5. The method of claim 1, wherein the duration for the timer is determined based on the geographic region of service of the channel associated with the particular programming.

6. The method of claim 1, further comprising:
   allocating, by the television receiver, a particular tuner of the television receiver for monitoring status of the commercial break in response to detecting the channel change event.

7. The method of claim 1, further comprising:
   detecting, by the television receiver, selection of the particular icon within the interface; and
   outputting, by the television receiver, the particular programming for presentation by the display device.

8. The method of claim 1, further comprising:
   detecting, by the television receiver, selection of another particular icon within the interface; and
   outputting, by the television receiver, programming other than the particular programming for presentation by the display device.

9. A television receiver, comprising:
   one or more processors;
   one or more tuners; and
   a memory communicatively coupled with and readable by the one or more processors and having stored therein processor-readable instructions that, when executed by the one or more processors, cause the one or more processors to:
      detect, during a commercial break in particular programming, a viewer-initiated channel change event from a channel associated with the particular programming to a different channel;
      count the number of channel changes within a predetermined period of time during the commercial break;
      compare the number of channel changes within the predetermined period of time to a channel change threshold;
      upon determining that the number of channel changes within the predetermined period of time exceeds the channel change threshold, determine that the viewer has entered a channel surf mode; and
      in response to determining that the viewer has entered the channel surf mode, output for presentation by a display device an interface that indicates an upcoming end to the commercial break and that provides an icon that when selected switches back to the channel associated with the particular programming.

10. The television receiver of claim 9, wherein the memory having stored therein processor-readable instructions which, when executed by the one or more processors, cause the one or more processors to:
    allocate a particular one of the tuners for monitoring status of the commercial break in response to detection of the channel change event.

11. The television receiver of claim 9, wherein the memory having stored therein processor-readable instructions which, when executed by the one or more processors, cause the one or more processors to:
    activate a timer in response to detection of the channel change event; and
    output the interface for presentation by the display device in response to expiration of the timer.

12. The television receiver of claim 9, wherein the memory having stored therein processor-readable instructions which, when executed by the one or more processors, cause the one or more processors to:
    detect selection of the particular icon within the interface, and output the particular programming for presentation by the display device.

13. The method of claim 2, wherein identifying the user-interest in the particular broadcast programming comprises:
    determining, by the television receiver, a percentage of a previous broadcast segment of the particular broadcast programming during which the television receiver was tuned to the particular broadcast programming; and
    determining, by the television receiver, that the percentage of the previous broadcast segment during which the television receiver was tuned to the particular broadcast programming exceeds a predetermined percentage threshold associated with the identification of user-interest in the particular broadcast programming.

14. The television receiver of claim 9, wherein the channel change threshold is greater than one.

15. A computer-implemented method, comprising:
    detecting, by a television receiver, during a commercial break in particular programming, a viewer-initiated channel change event from a channel associated with the particular programming to a different channel;

counting, by the television receiver, the number of channel changes within a predetermined period of time during the commercial break;

comparing, by the television receiver, the number of channel changes within the predetermined period of time to a channel change threshold;

upon determining that the number of channel changes within the predetermined period of time exceeds the channel change threshold, determining, by the television receiver, that the viewer has entered a channel surf mode; and in response to determining that the viewer has entered the channel surf mode, outputting for presentation, by the television receiver and via a display device, an interface that indicates an upcoming end to the commercial break and that provides an icon that when selected switches back to the channel associated with the particular programming.

16. The method of claim 15, further comprising:
allocating, by the television receiver, a particular tuner of the television receiver for monitoring status of the commercial break in response to detecting the channel change event.

17. The method of claim 15, further comprising:
activating, by the television receiver, a timer in response to detection of the channel change event; and
outputting, by the television receiver, the interface for presentation by the display device in response to expiration of the timer.

18. The method of claim 15, further comprising:
detecting, by the television receiver, selection of the particular icon within the interface; and
outputting, by the television receiver, the particular programming for presentation by the display device.

19. The method of claim 15, wherein the channel change threshold is greater than one.

* * * * *